(12) United States Patent
Dost

(10) Patent No.: US 8,979,444 B2
(45) Date of Patent: Mar. 17, 2015

(54) CUTTING BIT ADAPTED TO CUT METAL AND WOOD AND ASSOCIATED METHOD

(75) Inventor: Hagen W. Dost, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 2323 days.

(21) Appl. No.: 11/810,706

(22) Filed: Jun. 7, 2007

(65) Prior Publication Data
US 2008/0304927 A1    Dec. 11, 2008

(51) Int. Cl.
  *B23B 51/00*    (2006.01)
  *B27G 15/00*    (2006.01)
  *B23P 15/28*    (2006.01)

(52) U.S. Cl.
  CPC ............ *B27G 15/00* (2013.01); *B23B 51/0009* (2013.01); *B23P 15/28* (2013.01); *B23B 2260/1381* (2013.01)
  USPC ............................. 408/214; 408/225; 408/228

(58) Field of Classification Search
  USPC .......... 408/211–214, 216, 222, 225, 228, 229
  See application file for complete search history.

(56) References Cited

U.S. PATENT DOCUMENTS

| | | | | |
|---|---|---|---|---|
| 1,910,143 A | * | 5/1933 | Arenz | 408/213 |
| 2,035,298 A | * | 3/1936 | Caldwell | 408/212 |
| 2,627,292 A | | 2/1953 | Kronwall | |
| 2,883,888 A | | 4/1959 | Stewart | |
| 3,064,699 A | * | 11/1962 | Gleason | 408/212 |
| 3,920,350 A | * | 11/1975 | Southall | 408/211 |
| 3,997,279 A | * | 12/1976 | Porter | 408/211 |
| 4,625,593 A | * | 12/1986 | Schmotzer | 76/108.6 |
| 4,682,917 A | * | 7/1987 | Williams et al. | 408/212 |
| 4,815,902 A | * | 3/1989 | Durfee, Jr. | 408/225 |
| 4,948,306 A | | 8/1990 | Wiedner et al. | |
| 4,998,853 A | * | 3/1991 | Shinjo | 411/29 |

(Continued)

FOREIGN PATENT DOCUMENTS

| | | | | |
|---|---|---|---|---|
| GB | 2130935 A | * | 6/1984 | ............ B27G 15/00 |
| WO | WO 98/05459 | | 2/1998 | |
| WO | WO 2004/080632 | | 9/2004 | |

*Primary Examiner* — Eric A Gates
(74) *Attorney, Agent, or Firm* — Maginot Moore & Beck LLP

(57) ABSTRACT

A cutting bit adapted to cut wood or metal is disclosed. The cutting bit is prepared by a process which includes the step of performing a forming operation on a metal blank so as to create a formed metal part that includes (i) a shaft having a polygonal shaped drive surface and defining an axis, (ii) a body having a proximal end and a distal end, the proximal end of the body being attached to the shaft, the body further having a first shoulder and a second shoulder at the distal end thereof, the first shoulder defining a first cutting edge segment, and the second shoulder defining a second cutting edge segment, the axis extending between the first cutting edge segment and the second cutting edge segment, (iii) a central cutting member extending from the body so that the central cutting member is aligned with the axis, (iv) a first cutting spur extending from the distal end of the body, the first cutting edge segment being interposed between the first cutting spur and the axis, and (v) a second cutting spur extending from the distal end of the body, the second cutting edge segment being interposed between the second cutting spur and the axis. The process of preparing the cutting bit further includes the step of performing a carburization operation on the formed metal part after the first step so as to create the cutting bit. The cutting bit is particularly useful in performing a drilling operation on a metal construction wall stud to form a hole therein.

5 Claims, 10 Drawing Sheets

(56) References Cited

U.S. PATENT DOCUMENTS

| | | | |
|---|---|---|---|
| 5,193,951 A * | 3/1993 | Schimke | 408/233 |
| 5,221,166 A | 6/1993 | Bothum | |
| 5,286,143 A * | 2/1994 | Schimke | 408/211 |
| 5,433,561 A | 7/1995 | Schimke | |
| 5,452,970 A * | 9/1995 | Sundstrom et al. | 408/211 |
| 5,700,113 A | 12/1997 | Stone et al. | |
| 6,227,774 B1 | 5/2001 | Haughton et al. | |
| 6,354,773 B1 * | 3/2002 | Konen | 408/213 |
| 6,652,202 B2 * | 11/2003 | Remke et al. | 408/214 |
| 6,957,937 B2 * | 10/2005 | Vasudeva | 408/211 |
| 7,267,513 B2 * | 9/2007 | Wiker et al. | 408/214 |
| 7,473,056 B2 * | 1/2009 | Durfee | 408/225 |
| 8,262,325 B2 * | 9/2012 | Dost et al. | 408/214 |
| 2002/0127071 A1 | 9/2002 | Vasudeva | |
| 2004/0156689 A1 * | 8/2004 | Shen | 408/212 |
| 2008/0101879 A1 * | 5/2008 | Durfee | 408/214 |
| 2008/0166194 A1 * | 7/2008 | Durfee | 408/214 |
| 2009/0269155 A1 * | 10/2009 | Wang | 408/211 |

* cited by examiner

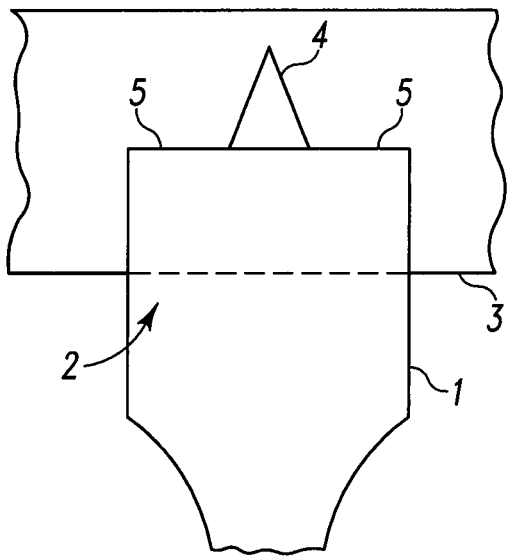
Fig. 1
Prior Art
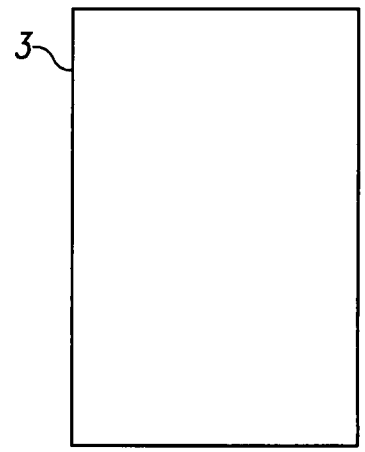
Fig. 1A
Prior Art
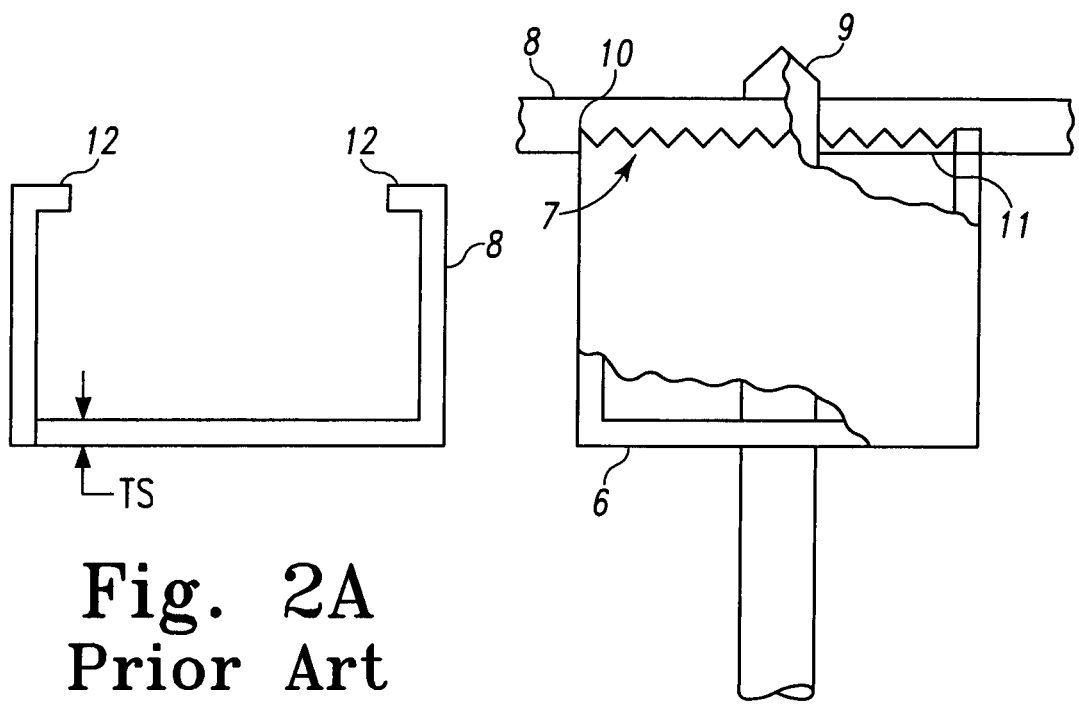
Fig. 2A
Prior Art
Fig. 2
Prior Art

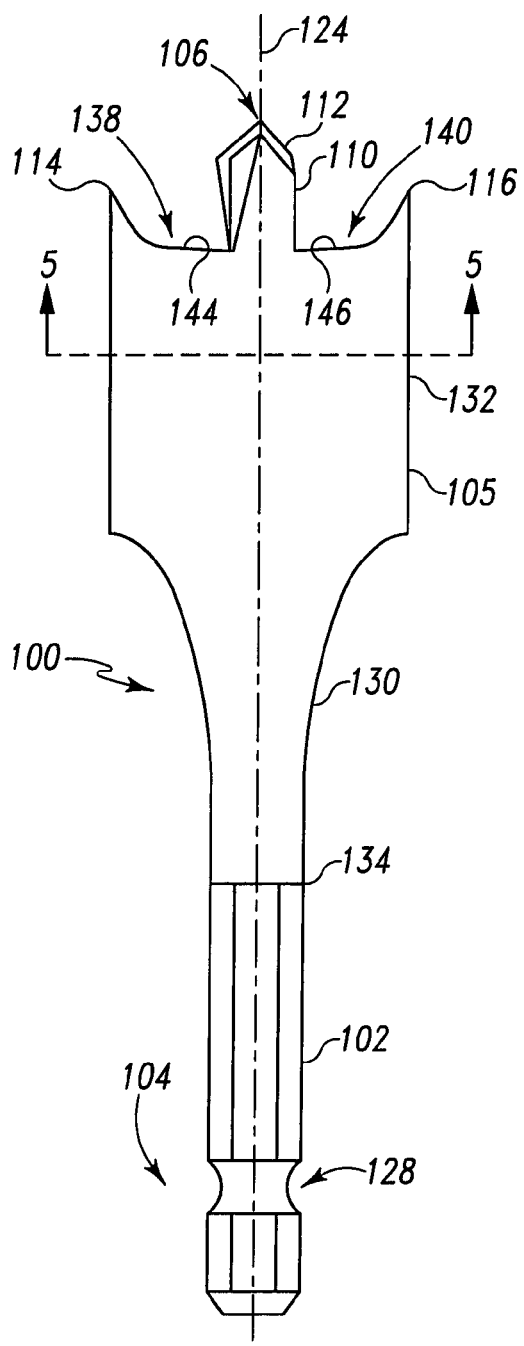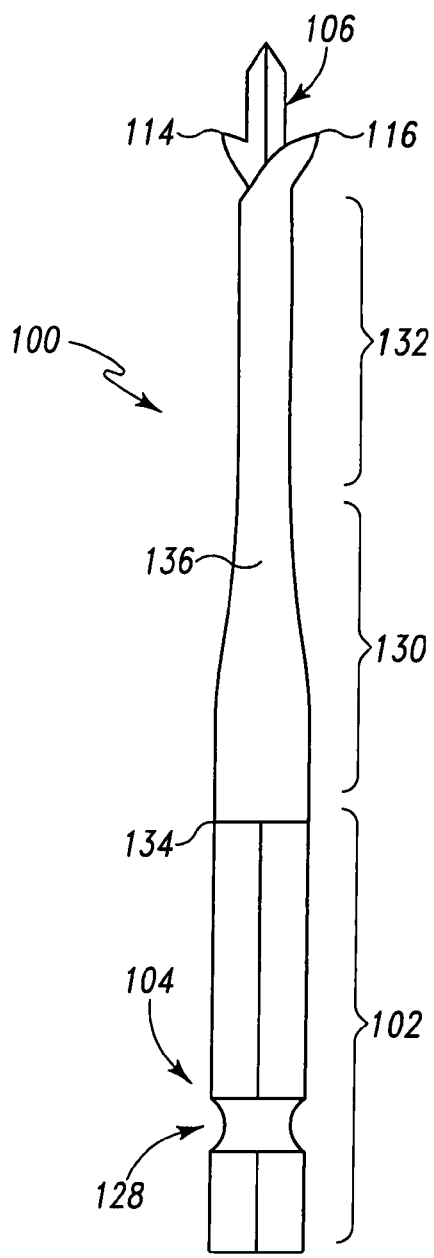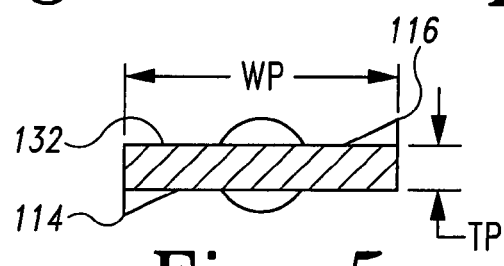
Fig. 3
Fig. 4
Fig. 5

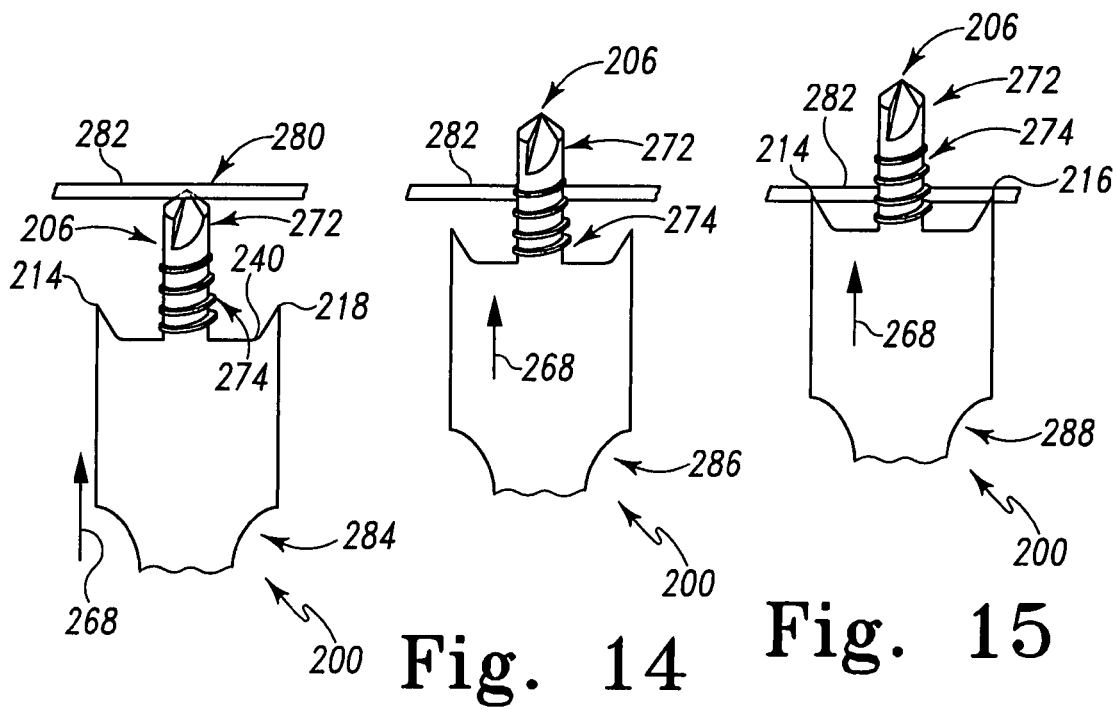
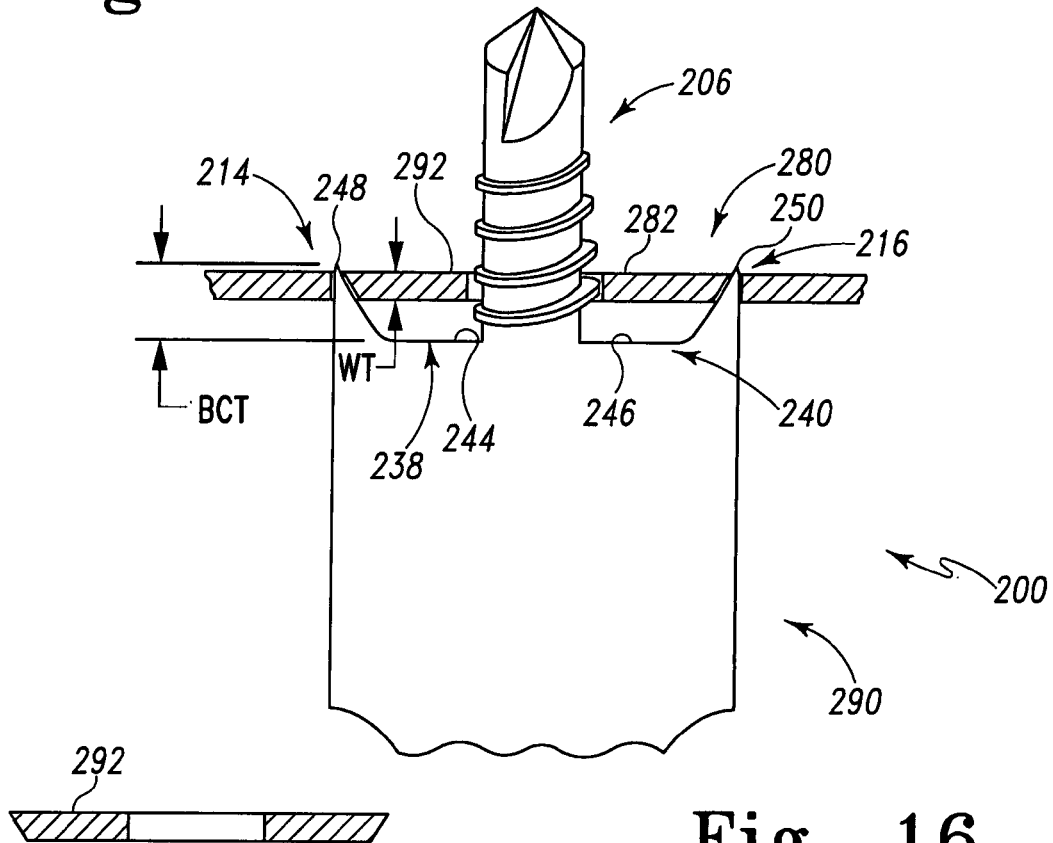

US 8,979,444 B2

CUTTING BIT ADAPTED TO CUT METAL AND WOOD AND ASSOCIATED METHOD

FIELD OF THE DISCLOSURE

The present disclosure relates to a cutting bit, and more particularly a spade-type drill bit.

BACKGROUND OF THE DISCLOSURE

Home construction recently has been in a conversion from the use of wooden frame construction to the use of metal frame construction. Wooden studs, particularly 2×4 and 2×6 studs have been replaced with metal studs. When performing home construction numerous holes or openings are required to be machined into the wall studs to permit the wiring, plumbing and other utility services to be placed behind walls and below floors of home construction.

Referring now to FIG. 1, a prior art spade drill 1 is shown for use in preparing hole 2 in a stud, for example a 2×4 wooden stud 3. The drill bit 1 includes a pilot 4 which extends from cutting face 5 of the drill bit 1. The pilot 4 contacts the stud 3 and provides a pilot or guide until the cutting face 5 contacts the stud 3 and serves to remove material from the stud 3 to provide opening 2.

Referring now to FIG. 1A, a 2×4 wooden stud 3 is shown in cross section. The 2×4 stud 3 has cross sectional dimensions of about 1½ inches by 3½ inches.

For metal studs, a hole saw 6 is typically used for preparing openings 7 in the metal studs 8. As shown in FIG. 2, the hole saw 6 includes a pilot 9 as well as a peripheral circular cutting surface 10. The pilot 9 first contacts the metal stud 8. After the pilot 9 has engaged the stud 8, the peripheral circular cutting surface 10 of the hole saw 6 creates a cylindrical opening in the metal stud 8 whereby a plug (not shown) is created from material of the metal stud 8. The plug is then removed from the hole saw 6.

Referring now to FIG. 2A, a metal construction wall stud 8 is shown in cross section. The metal stud 8 has cross sectional shape that is generally U-shaped with opposed lips 12 extending inwardly for the end of the U-shape. The metal stud 8 is typically made of 20 gauge mild steel and has a thickness TS of about 0.0359 inches.

The prior art hole saw 6 for use in preparing holes in metal stud 8 as shown in FIG. 2A is a relatively expensive tool. Further, the use of construction crews to build homes having either a combination of metal and wooden studs or having the frame crew of the construction company preparing both wooden framed homes and metal framed homes requires the framers to have drill bits for wood and separate drill bits for metal studs.

There is a need for a less expensive drill bit for use in preparing openings in metal wall studs.

SUMMARY OF THE DISCLOSURE

In accordance with one embodiment of the present disclosure, there is provided a cutting bit adapted to cut wood or metal. The cutting bit is prepared by a process which includes the step of performing a forming operation on a metal blank so as to create a formed metal part that includes (i) a shaft having a polygonal shaped drive surface and defining an axis, (ii) a body having a proximal end and a distal end, the proximal end of the body being attached to the shaft, the body further having a first shoulder and a second shoulder at the distal end thereof, the first shoulder defining a first cutting edge segment, and the second shoulder defining a second cutting edge segment, the axis extending between the first cutting edge segment and the second cutting edge segment, (iii) a central cutting member extending from the body so that the central cutting member is aligned with the axis, (iv) a first cutting spur extending from the distal end of the body, the first cutting edge segment being interposed between the first cutting spur and the axis, and (v) a second cutting spur extending from the distal end of the body, the second cutting edge segment being interposed between the second cutting spur and the axis. The process used to prepare the cutting bit further includes performing a carburization operation on the formed metal part after the first step so as to create the cutting bit.

Pursuant to another embodiment of the present disclosure, there is provided a method of performing a drilling operation on a metal construction wall stud. The method includes providing a cutting bit. The cutting bit is prepared by a process which includes the steps of performing a forming operation on a metal blank so as to create a formed metal part that includes (i) a shaft having a polygonal shaped drive surface and defining an axis, (ii) a body having a proximal end and a distal end, the proximal end of the body being attached to the shaft, the body further having a first shoulder and a second shoulder at the distal end thereof, the first shoulder defining a first cutting edge segment, and the second shoulder defining a second cutting edge segment, the axis extending between the first cutting edge segment and the second cutting edge segment, (iii) a central cutting member extending from the body so that the central cutting member is aligned with the axis, (iv) a first cutting spur extending from the distal end of the body, the first cutting edge segment being interposed between the first cutting spur and the axis, and (v) a second cutting spur extending from the distal end of the body, the second cutting edge segment being interposed between the second cutting spur and the axis. The process of preparing the cutting bit further includes performing a carburization operation on the formed metal part after the first step so as to create the cutting bit. The method further includes advancing the cutting bit toward a metal wall of the metal wall construction stud so that (i) the central cutting member contacts the metal wall, and (ii) each of the first cutting spur, the second cutting spur, the first cutting edge segment, and the second cutting edge segment is spaced apart from the metal wall. In addition, the method includes further advancing the cutting bit toward the metal wall so that (i) the central cutting member advances through the metal wall, (ii) each of the first cutting spur and the second cutting spur contact the metal wall, and (iii) each of the first cutting edge segment and the second cutting edge segment is spaced apart from the metal wall. Further, the method includes further advancing the cutting bit toward the metal wall so that (i) the central cutting member advances through the metal wall, (ii) each of the first cutting spur and the second cutting spur advances through the metal wall, and (iii) each of the first cutting edge segment and the second cutting edge segment is spaced apart from the metal wall, whereby a hole is formed in the metal wall and a metal plug is created from material of the metal wall.

The advantages of the present disclosure include the ability to cut metal studs with a spade drill bit, the ability to cut a hole in both metal and wooden construction studs with the same drill bit, the ability to provide a fast, quick, inexpensive drill bit for creating metal holes in metal materials, the ability to drill in metal with minimal effort and resistance torque, and the ability to provide for an inexpensive method of making a metal cutting drill bit.

These and other objects of the disclosure will become apparent upon consideration of the following written description taken together with the accompanying figures.

BRIEF DESCRIPTION OF THE DRAWINGS

The accompanying drawings illustrate various embodiments of the cutting bit of the present disclosure and together with a description serve to explain the principles of the disclosure. In the drawings:

FIG. 1 is a fragmentary plan view, partially in cross section, of a prior art spade drill bit in contact with a wooden stud;

FIG. 1A is a cross sectional view of the wooden stud of FIG. 1;

FIG. 2 is a fragmentary plan view, partially in cross section, of a prior art metal cutting drill bit in contact with a metal stud;

FIG. 2A is a cross sectional view of the metal stud of FIG. 1;

FIG. 3 is a plan view of a cutting bit of one embodiment of the present disclosure;

FIG. 4 is a side elevational view of the cutting bit of FIG. 3;

FIG. 5 is a cross sectional view taken along the line 5-5 of FIG. 3 in the direction of the arrows;

FIG. 13 is a partial plan view of the cutting bit of FIG. 9 with the self drilling portion of the central cutting member engaged with a metal construction stud;

FIG. 14 is a partial plan view of the cutting bit of FIG. 9 with the self tapping portion of the central cutting member engaged with the metal construction stud of FIG. 13;

FIG. 15 is a partial plan view of the cutting bit of FIG. 9 with the cutting spurs and the self tapping portion engaged with the metal construction stud of FIG. 14;

FIG. 16 is a partial plan view of the cutting bit of FIG. 9 with the cutting spurs advanced through the metal construction stud of FIG. 15 and showing a metal plug formed as a result of the cutting process of FIGS. 13-16;

FIG. 17 is a cross-sectional view of the metal plug of FIG. 16;

Corresponding reference characters indicate corresponding parts throughout the several views. Like reference characters tend to indicate like parts throughout the several views.

DETAIL DESCRIPTION OF THE DISCLOSURE

Figure 6:
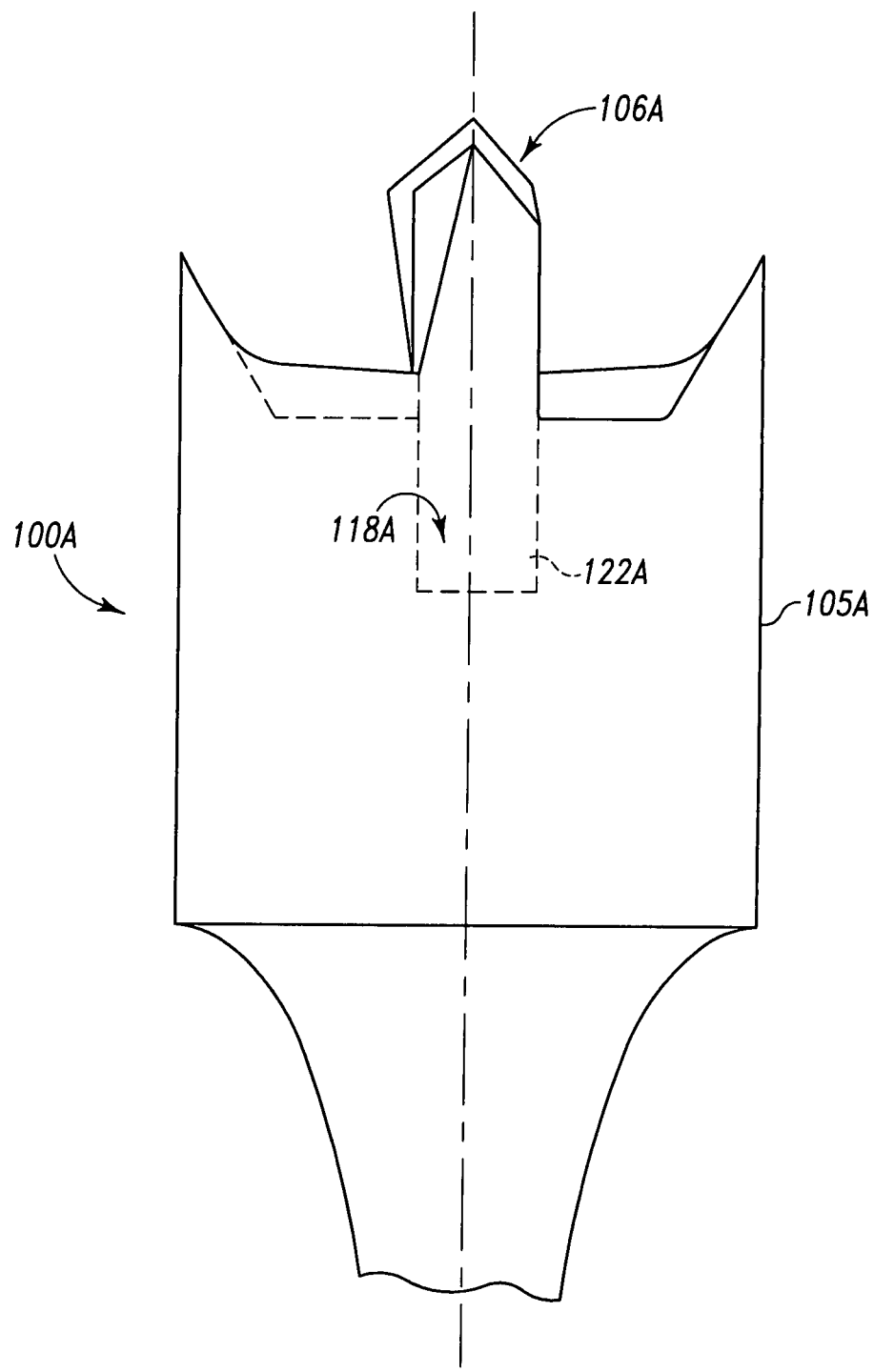
FIG. 6 is a fragmentary plan view of a cutting bit of another embodiment of the present disclosure.

Reference will now be made in detail to various preferred embodiments of the cutting bit of the present disclosure, examples of which are illustrated in the accompanying drawings. In the various figures some of the structures are referenced with similar reference numerals.

According to the present disclosure and referring now to FIGS. 3 and 4, a cutting bit or spade drill bit 100 is shown. The spade drill bit 100 includes a shaft 102 that defines an axis 124. The shaft 102 includes a polygonal shaped drive surface. In particular, the drive surface is hexagonal shaped as shown in FIGS. 3 and 4. The shaft 102 has an end 104 configured to be engaged to a driving tool (not shown). The driving tool may be in the form of, for example, a power tool, for example an electric power drill. The shaft 102 includes a peripheral groove 128 positioned spaced from the terminal end of the shaft 102.

The spade drill bit 100 further includes a body 105 that is attached to the shaft 102 by being integrally formed therewith. The body 105 has a proximal end and a distal end. The proximal end of the body 105 is attached to the shaft 102. The body 105 includes a first shoulder that defines a first cutting edge segment 138. The body 105 further includes a second shoulder that defines a second cutting edge segment 140. The first cutting edge segment 138 defines a distal edge 144, while the second cutting edge segment 140 defines a distal edge 146 thereof.

The cutting bit 100 further includes a central cutting member 106. The central cutting member 106 includes a base 110 and a tip portion 112 extending from the base 110. The cutting bit 100 further includes a first cutting spur 114 extending from the distal end of the body 105 as shown in FIGS. 3 and 4. The cutting bit 100 also includes a second cutting spur 116 extending from the distal end of the body 105 as shown in FIGS. 3 and 4.

It should be appreciated that the central cutting member 106 is aligned with the axis 124. Moreover, the axis 124 extends between the first cutting edge segment 138 and the second cutting edge segment 140. The first cutting edge segment 138 is interposed between the first cutting spur 114 and the axis 124. The second cutting edge segment 140 is interposed between the second cutting spur and the axis 124.

The body 105 includes a transition portion 130 extending from shaft 102 and a rectangular portion 132 extending from the transition portion 130. The rectangular portion 132 for simplicity is rectangular but may have any suitable shape. The rectangular portion 132 is shown in cross section in FIG. 5. As shown in FIG. 5, the rectangular portion has a width WP which is substantially greater than the thickness TP of the rectangular portion 132. The transition portion 130 has a shape at first end 134 that is generally hexagonal in cross-section and is similar to that of shaft 102, and a second end 136 that has a shape which is generally rectangular in cross-section which is similar to the cross-section of rectangular portion 132.

The cutting bit 100 is constructed to be of a unitary or one piece construction. Alternatively, the cutting bit 100 may be made of a plurality of components which are assembled to each other to create a spade drill bit.

For example, FIG. 6 shows another embodiment of a cutting bit 100A according to the present disclosure. The cutting bit 100A is similar to the spade drill bit 100 of FIGS. 3 and 4 except the cutting bit 100A includes a central cutting member 106A that, prior to assembly, is a separate component from the body 105A of the cutting bit 100A. The central cutting member 106A may, for example, have a cylindrical end 122A that fits into cylindrical opening 118A formed in body 105A of the cutting bit 100A. The cylindrical end 122A may fit into the opening 118A by an interference fit or the cylindrical end 122A may be threadably connected to the opening 118A or welded thereto.

Figure 7:
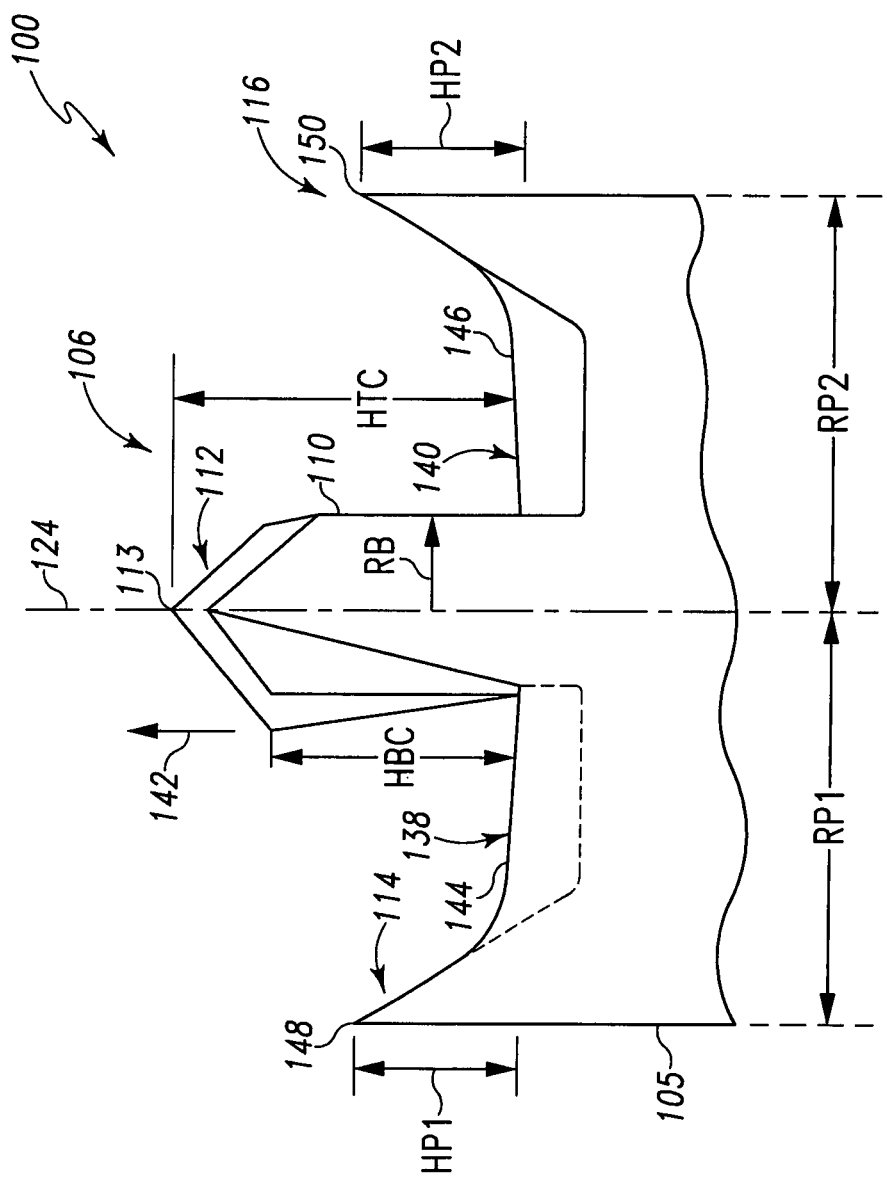
FIG. 7 is an enlarged fragmentary plan view of the cutting bit of FIG. 3.

Referring now to FIG. 7, the distal end of the cutting bit 100 is shown in greater detail. The central cutting member 106 is configured such that it is the first portion of the cutting bit 100 to contact a work piece when advanced in the direction of arrow 142. The first cutting spur 114 and the second cutting spur 116 is arranged such that when the spade drill bit 100 is advanced in the direction of arrow 142, the cutting spurs 114 and 116 are engaged with the work piece after the central cutting member 106 is engaged with the work piece. The first cutting edge segment 138 and the second cutting edge segment 140 of the cutting bit 100 are configured such that the cutting edge segments 138 and 140 contact the work piece after the cutting spurs 114 and 116 contact the work piece when the cutting bit 100 is advanced in the direction of arrow 142.

The central cutting member 106 includes the tip portion 112 which extends from the base 110. A tip 113 of the tip portion 112, as shown in FIG. 7, extends the farthest from the distal end of the body 105. For example and as shown in FIG. 7, the tip 113 extends a distance HTC from the distal end of the body 105. The base 110 of the central cutting member 106 extends a distance HBC from the distal end of the body 105. The dimension HTC is greater than the dimension HBC.

The first cutting spur 114 extends a distance HP1 from the distal end of the body 105, while the second cutting spur 116 extends a distance HP2 from the distal end of the body 105. To provide for efficient cutting, the dimensions HP1 and HP2 are generally the same. The dimension HP1 and HP2 is less than the dimension HBC of the base 110 of the central cutting member 106 as shown in FIG. 7.

The tip portion 112 of the central cutting member 106 is positioned along longitudinal axis 124 of the cutting bit 100 as shown in FIG. 7. The base 110 extends a distance RB from the axis 124 of the cutting bit 100. The base 110 possesses a generally cylindrical shape as shown in FIG. 7.

The edge 148 of the first cutting spur 114 is defined by a dimension RP1 from the axis 124 of the cutting bit 100. Similarly, the edge 150 of the second cutting spur 116 is defined by a dimension RP2 extending from the axis 124 of the drill bit 100. The dimensions RP1 and RP2 as shown in FIG. 7 are generally the same to provide for efficient and smooth cutting.

The dimension of the first cutting spur 114 and the second cutting spur 116 are selected to provide for optimum cutting of both metals and wooden materials. The dimensions of the first cutting edge segment 138 and the second cutting edge segment 140 are selected to provide for optimum cutting of wooden materials.

Figure 8A:
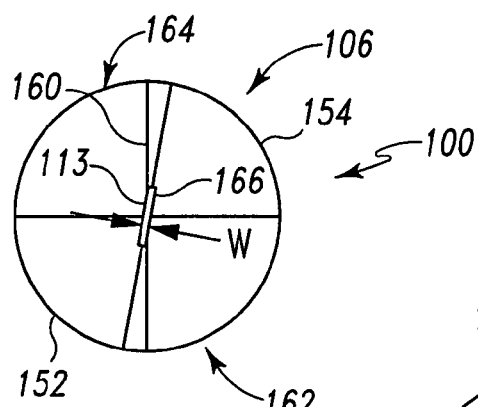
FIG. 8A is a reduced elevational end view of the central cutting member of the cutting bit of FIG. 8.
Figure 8:
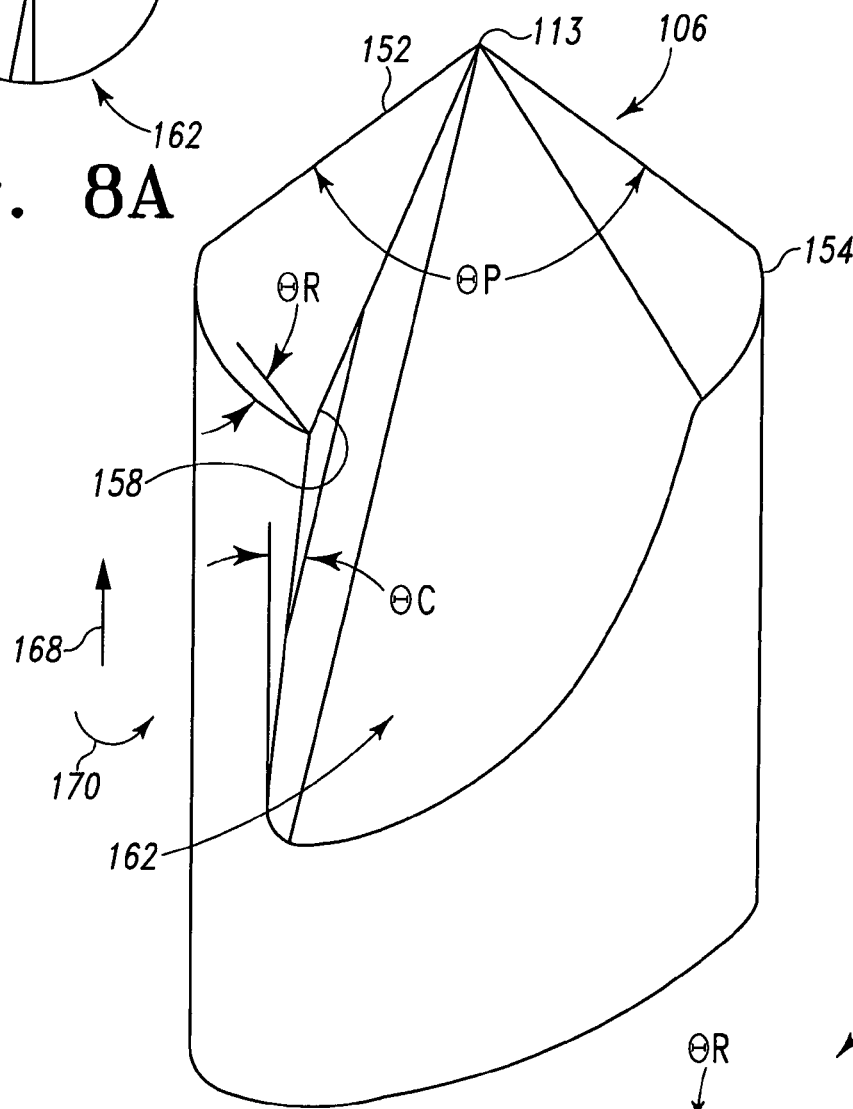
FIG. 8 is an enlarged fragmentary perspective view of the central cutting member of the cutting bit of FIG. 3.
Figure 8B:
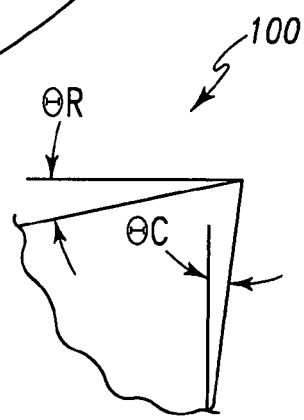
FIG. 8B is a fragmentary perspective view of the central cutting member of FIG. 8.

Referring now to FIGS. 8, 8A, and 8B, the distal end portion of the central cutting member 106 of the cutting bit 100 is shown in greater detail. The central cutting member 106 includes a first flute 152. While the central cutting member 106 may include a solitary flute, it should be appreciated that a pattern of flutes may provide for a more uniform cutting force. To that end, the central cutting member 106 includes a second flute 154 spaced apart from the first flute 152. The first flute 152 extends from the tip 113 of the tip portion 112 of the central cutting member 106 toward the base 110 of the central cutting member 106. The first flute 152 and the second flute 154 define a point angle OP of the central cutting member 106. The first flute 152 defines a first cutting edge 158 while second flute 154 defines a second cutting edge 160 (see FIG. 8A). The first cutting edge 158 is defined by a cutting angle θC and a lip relief θR.

Referring again to FIG. 8A, the central cutting member 106 includes a web 166 positioned at tip 113. The web 166 may be defined by a web thickness W. Referring now to FIG. 8B, the lip relief θR and the cutting angle θC are shown in greater detail.

Referring again to FIG. 8, the dimensions of the central cutting member 106 are selected such that the cutting bit 100 is self-drilling. To be self-drilling, the central cutting member 106 when rotated by a tool, for example a power tool, will tend to advance in the direction of arrow 168 when rotated in the direction of arrow 170. In other words, the cutting bit 100 possesses a configuration such that, when rotated in the direction of arrow 170, the cutting bit 100 advances in the direction of arrow 168.

While the cutting bit 100 of FIGS. 3-5 and 7-8 may be utilized both for cutting metal and for cutting wood, it should be appreciated that the cutting bit may have other configurations. While the self-drilling action of the central cutting member of the cutting bits of FIGS. 3-5 and 7-8 is sufficient to advance the bit in the direction of the work piece, it should be appreciated that once the cutting spurs of the cutting bit contact the work piece the self-drilling action of the central cutting member may not be sufficient to pull or draw the cutting bit through the work piece. Thus, other structural configurations of the central cutting member may be provided to the cutting bit to facilitate pulling of the cutting bit through the work piece when cutting with the cutting spurs 114,116.

Figure 9:
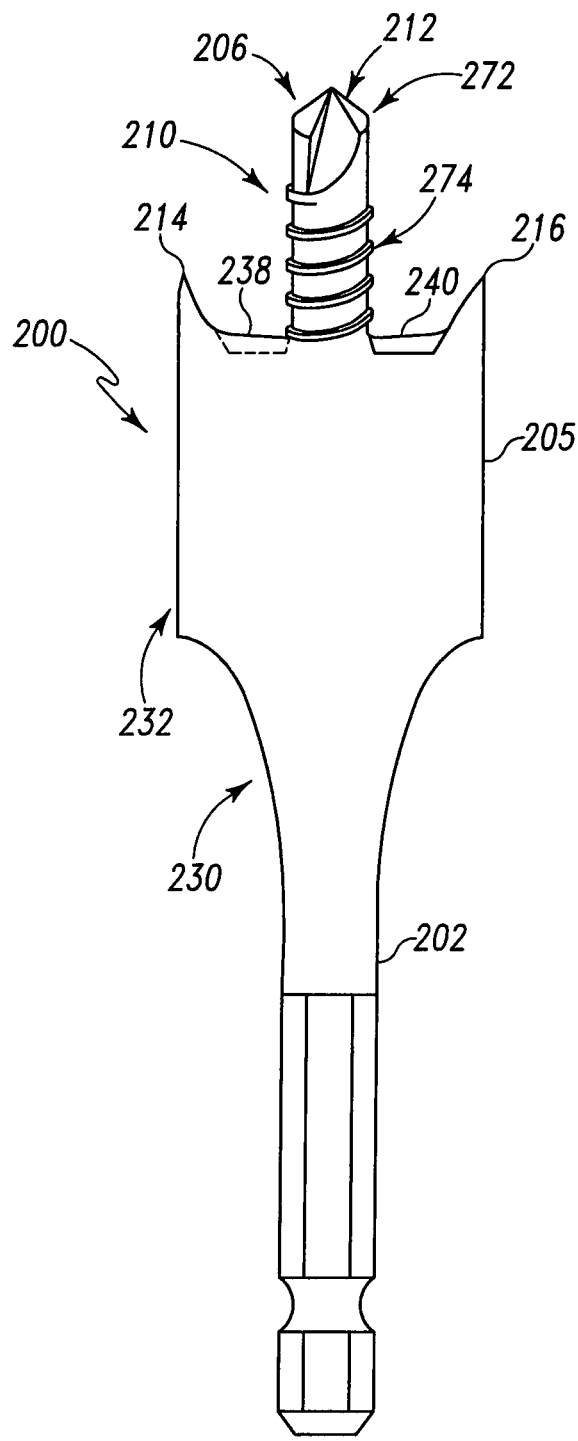
FIG. 9 is a plan view of a cutting bit according to another embodiment of the present disclosure, the cutting bit including both self drilling and self tapping features.
Figures 21, 22, 23:
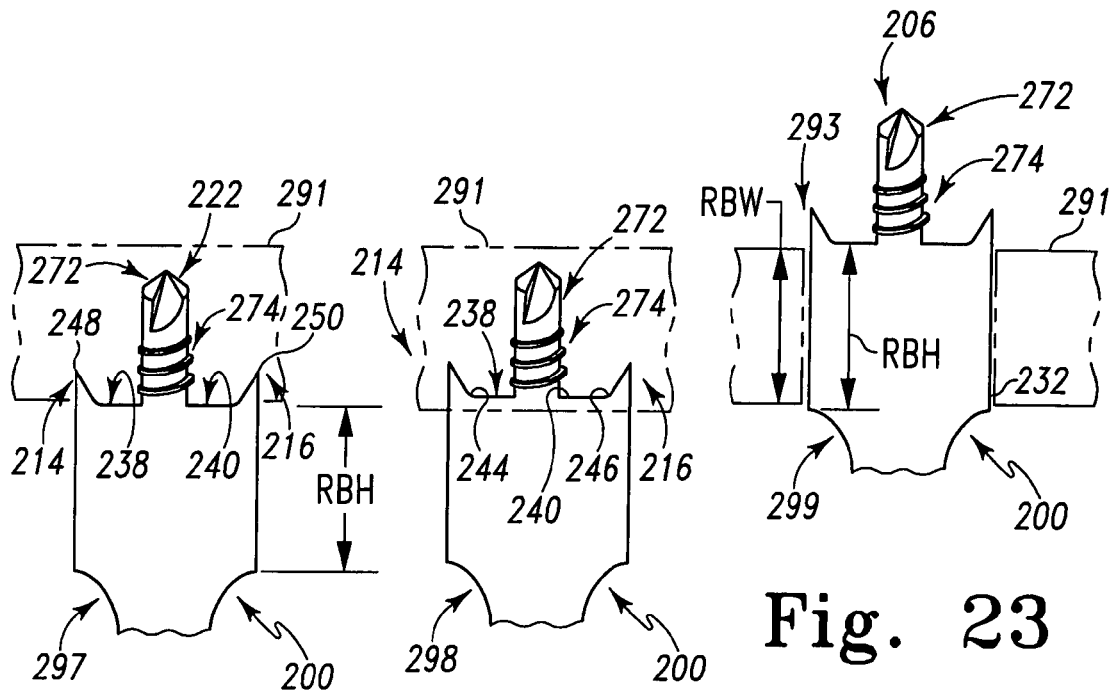
FIG. 21 is a partial plan view of the cutting bit of FIG. 9 with the self drilling portion, the self tapping portion, and the cutting spurs fully engaged with the wooden construction stud of FIG. 20.
FIG. 22 is a partial plan view of the spade drill bit of FIG. 9 with the self drilling portion, the self tapping portion, the cutting spurs, and the cutting edge segments engaged with the wooden construction stud of FIG. 21.
FIG. 23 is a partial plan view of the spade drill bit of FIG. 9 with the central cutting member, the cutting spurs, and the cutting edge segments advanced through the wooden construction stud of FIG. 22.

For example, FIGS. 9 through 23 show yet another embodiment of the present disclosure. In particular, FIGS. 9 and 23 show a cutting bit or spade bit 200. The cutting bit 200 is similar to the cutting bit 100, except that the cutting bit 200 includes a self-tapping portion or a self-threading portion 274, in addition to a self-drilling portion 272 that is similar in construction and configuration to the self-drilling portion of the cutting bit 100 of FIGS. 3-5 and 7-8.

Figure 10:
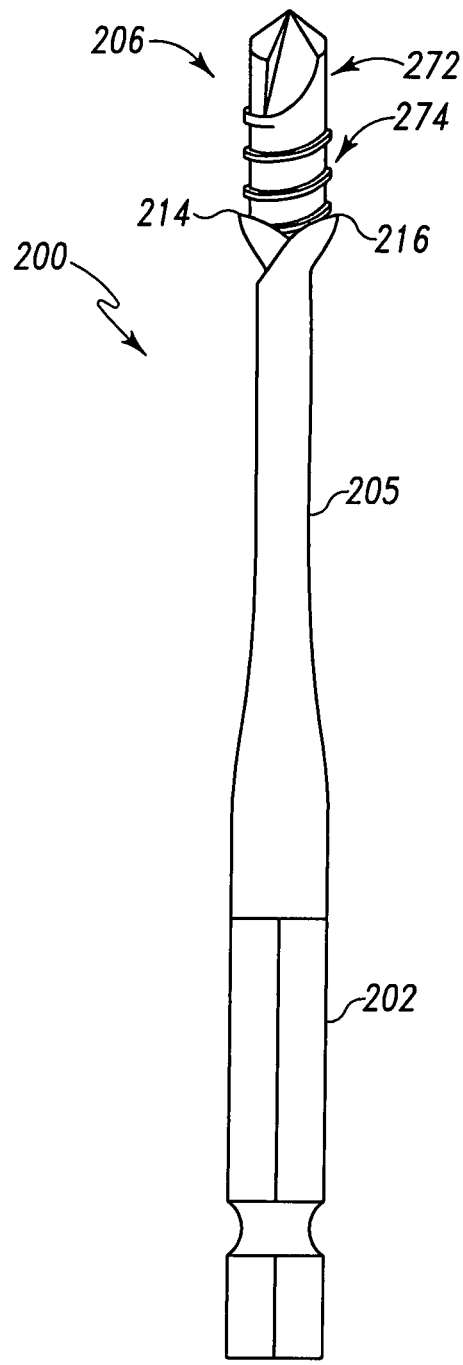
FIG. 10 is a side elevational view of the cutting bit of FIG. 9.

As shown in FIGS. 9 and 10, the cutting bit 200 includes a shaft 202 as well as a body 205 extending from the shaft 202. The shaft 202 and the body 208 are identical in construction and configuration to the shaft 102 and the body 105 of the cutting bit 100 of FIGS. 3-5 and 7-8. The body 205 includes a transition portion 230 connected to the shaft 202 and a rectangular portion 232 to which a central cutting member 206 is secured. The cutting bit further includes a first cutting spur 214 and a second cutting spur 216. The first cutting spur 214 is identical in construction and configuration to the first cutting spur 114 of the cutting bit 100 of FIGS. 3-5 and 7-8. Similarly, the second cutting spur 216 is identical in construction and configuration to the second cutting spur 116 of the cutting bit 100 of FIGS. 3-5 and 7-8. The drill bit 200 further includes a first cutting edge segment 238 and a second cutting edge segment 240. The first cutting edge segment 238 is identical in construction and configuration to the first cutting edge segment 138 of the cutting bit of FIGS. 3-5 and 7-8. Similarly, the second cutting edge segment 240 is identical in construction and configuration to the second cutting edge segment 140 of the cutting bit of FIGS. 3-5 and 7-8.

The central cutting member 206 of the cutting bit 200 is somewhat different in configuration in comparison to the central cutting member 106 of the drill bit 100 of FIGS. 3-5 and 7-8. In particular, central cutting member 206 includes a self-tapping portion (or self-threading portion) 274 in addition to a self-drilling portion 272 as shown in FIGS. 9-12. The central cutting member 206 includes a base 210 and a tip portion 212 which extends from the base 210. The base 210 extends from the body 205 of the cutting bit 200. The central cutting member 206 further includes the self-drilling portion 272 formed in tip portion 212 of the central cutting member 206. The central cutting member 206 further includes the self-threading portion 274 formed in the base 210 of the central cutting member 206.

Figure 11:
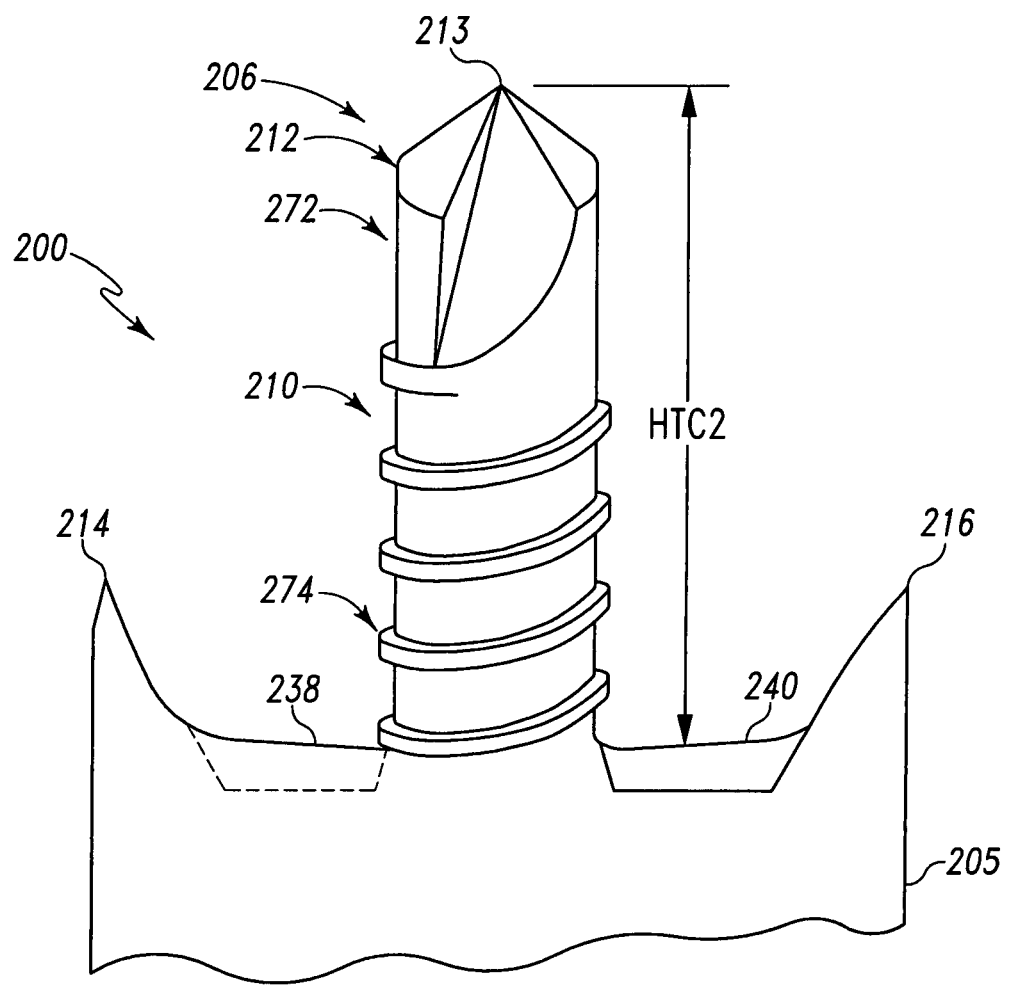
FIG. 11 is an enlarged fragmentary plan view of the cutting bit of FIG. 9.
Figure 12:
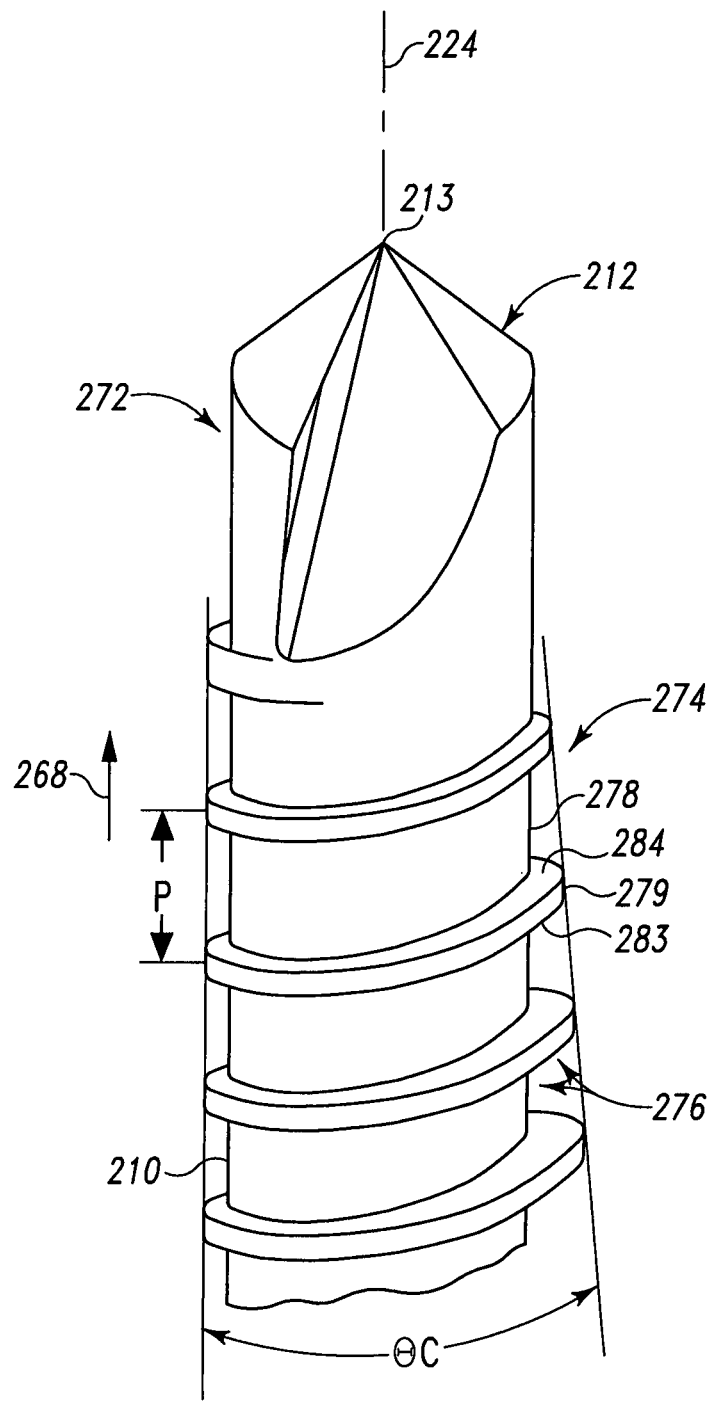
FIG. 12 is an enlarged fragmentary elevational view of the central cutting member of the cutting bit of FIG. 9.

The central cutting member 206 of the cutting bit 200 is shown in greater detail in FIGS. 11 and 12. To accommodate the self-threading portion 274, the central cutting member 206 has a height HTC2 measured from the tip 213 of the central cutting member 206 to the distal end of the body 205. The height HTC2 is greater than the height HTC of the central cutting member 106 of the cutting bit 100 of FIGS. 3-5 and 7-8. The self drilling portion 272 extends from the tip 213 of the drill bit 200 to the self threading portion 274. The self drilling portion 272 is identical in construction and configuration to the self drilling portion of the central cutting member 106 of the cutting bit 100 of FIGS. 3-5 and 7-8.

The self-threading portion 274 is configured so as to self-thread into an opening formed by the self-drilling portion 272 in a metal work piece such as a metal construction wall stud.

As shown in FIG. 12, the self-threading portion 274 is defined by a plurality of helical threads 276 which extend outwardly from a root 278 formed in the base 210 of the central cutting member 206. The threads 276 are defined by the root 278 and a crest 279. The crest 279 and the root 278 define a first flank 283 and a second flank 284 positioned between the crest 279 and the root 278. The crest 279 defines an included angle θC which extends along longitudinal axis 224 of the cutting bit 200.

The threads 276 are further defined by a pitch P. The pitch P and the angle θC are chosen to provide for proper self-threading of the cutting bit 200 as is well known in the art. It should be appreciated that the pitch P should be smaller for harder materials such that the feed rate or motion of the cutting bit in the direction of arrow 268 is optimized.

The cutting bits 100, 200 are made from a carbon steel material. One carbon steel material that may be used to make the cutting bits 100, 200 is a medium carbon steel material (AISI 1045-1060). The process in which the cutting bits 100, 200 are prepared or manufactured includes performing a forming operation on a metal blank so as to create a formed metal part, and thereafter performing a carburization operation on the formed metal part so as to create the cutting bit.

The step of performing a forming operation on a metal blank so as to create a formed metal part will now be discussed. One suitable forming operation for forming a formed metal part that is configured as the cutting bit 100 or cutting bit 200 is disclosed in U.S. Pat. No. 5,433,561 issued to Schimke (hereinafter 'the 561 patent), the disclosure of which is herein incorporated by reference in its entirety. Firstly, a metal blank such as a generally cylindrical headed blank of carbon steel is provided. The metal blank may be constructed and configured to be essentially the same of the metal blank 1 disclosed in the '561 patent. Then, a head of the metal blank is flattened. The head may be flattened by a forging process which utilizes compressive forces to shape the metal by plastic deformation. FIG. 3 of the '561 patent shows the appearance of the metal part after it is flattened. Thereafter, the flattened metal part undergoes various shaping operations to form the formed metal part having a configuration of the cutting bit 100 (see FIGS. 3-8) or cutting bit 200 (see FIGS. 9-12). These shaping operations include trimming metal from the flattened metal part so as to remove metal from the flattened metal part as discussed in detail in the '561 patent.

Thereafter, the formed metal part is carburized to create the cutting bit 100 and cutting bit 200. In particular, the formed metal part is placed in a carburization furnace whereby a carburization operation is performed on the formed metal part. The carburization operation hardens the formed metal part to create the cutting bit 100 and cutting bit 200. The resulting cutting bit 100 and cutting bit 200 possess a hardness of at least 55 $R_C$, and preferably a hardness of at least 60 $R_C$. Moreover, the resulting cutting bit 100 and cutting bit 200 possess a case hardening depth of at least 0.010 inches, and preferably a case hardening depth of at least 0.015 inches.

It should be appreciated that a carburization process involves surface hardening of steel by converting the outer layer of low-carbon steel to high-carbon steel by heating the steel above the transformation range in contact with a carbonaceous material. By subjecting the formed metal part to a carburization process, the resulting cutting bits 100, 200 are relatively hard and well suited for the interrupted cuts typically involved in the use of spade bits. Also, by hardening in this fashion, less expensive materials can be used thereby creating a relatively hard, less expensive cutting bit 100, 200.

Referring now to FIGS. 13-17, the cutting bit 200 is shown utilized to create an opening 280 in a work piece 282. The work piece 282 is a metal component, and in particular is a metal construction wall stud, which is similar in construction and configuration to wall stud 8 shown in FIG. 2A.

Referring to FIG. 16, the cutting bit 200 of the present disclosure is designed such that the first cutting edge segment 238 and the second cutting edge segment 240 are not used when the cutting bit 200 is used to drill a hole in the metal construction wall stud 282. In particular, the cutting bit 200 is designed such that a dimension BCT defined by an axial distance between cutting edges 248 and 250 of the cutting spurs 214 and 216, respectively, and the cutting edges 244 and 246 of the cutting edge segments 238 and 240 are greater than a thickness WT of the workpiece 282. This configuration prevents the use of the cutting edge segments 238 and 240 during drilling of the metal construction wall stud 282.

The thickness WT of the work piece 282 is 0.0359 inches. A typical home construction metal stud has a thickness or metal configuration of 20 gauge sheet metal. Twenty gauge sheet metal has a nominal thickness dimension of 0.0359 inches. Therefore, to accommodate for cutting a hole in metal home construction studs 282, the dimension BCT of the cutting bit 200 is substantially greater than 0.0359 inches. For example, the dimension BCT may be for example 0.040 inches or greater. Also, for example, the dimension BCT may be about twice the thickness WT of the work piece 282.

Referring now to FIG. 13, the cutting bit 200 is shown in a first position 284 with the cutting bit 200 in contact with the work piece 282. The central cutting member 206 of the cutting bit 200 first contacts the work piece 282 as shown in FIG. 13. As the central cutting member 206 first contacts the work piece 282, the self-drilling portion 272 of the central cutting member 206 begins to create an opening 280 in the work piece 282. The self-drilling portion 272 is configured to provide for the cutting bit 200 to be drawn in the direction of arrow 268 toward the work piece 282.

Referring now to FIG. 14, the cutting bit 200 is shown in a second position 286 with the cutting bit 200 advanced in the direction of arrow 268 such that the self-drilling portion 272 of the central cutting member 206 has passed through the work piece 282. At the second position 286, the self-threading portion 274 of the central cutting member begins to advance the drill bit 200 in the direction of arrow 286 at the proper feed rate for the next cutting of the work piece 282.

Referring now to FIG. 15, the cutting bit 200 is shown in a third position 288 in which the first cutting spur 214 and the second cutting spur 216 contact and begin cutting the work piece 282. The self-tapping portion 274 of the central cutting member 206 serves to create the feed rate or motion of the cutting of the cutting bit 200 in the direction of arrow 268.

Referring to FIG. 16, the cutting bit 200 is shown in a fourth position 290 with the edges 248 and 250 of the first cutting spur 214 and the second cutting spur 216 of the cutting bit 200 advanced through the work piece 282. At this point, the drilling of the opening 280 in the work piece 282 is complete. The cutting by the cutting bit 200 of the work piece 282 results in the preparation or creation of a plug 292 which is located or held by the central cutting member 206 of the cutting bit 200. The cutting bit 200 is designed such that the plug 292 falls freely from the spade drill bit 200 or may need to be manually removed from the drill bit 200. The plug 292 is shown in FIG. 17.

Referring now to FIGS. 18 through 23, the cutting bit 200 of the present disclosure is shown utilized to create an opening in a work piece 291 which is a wooden 2×4 construction stud.

Figures 18, 19, 20:
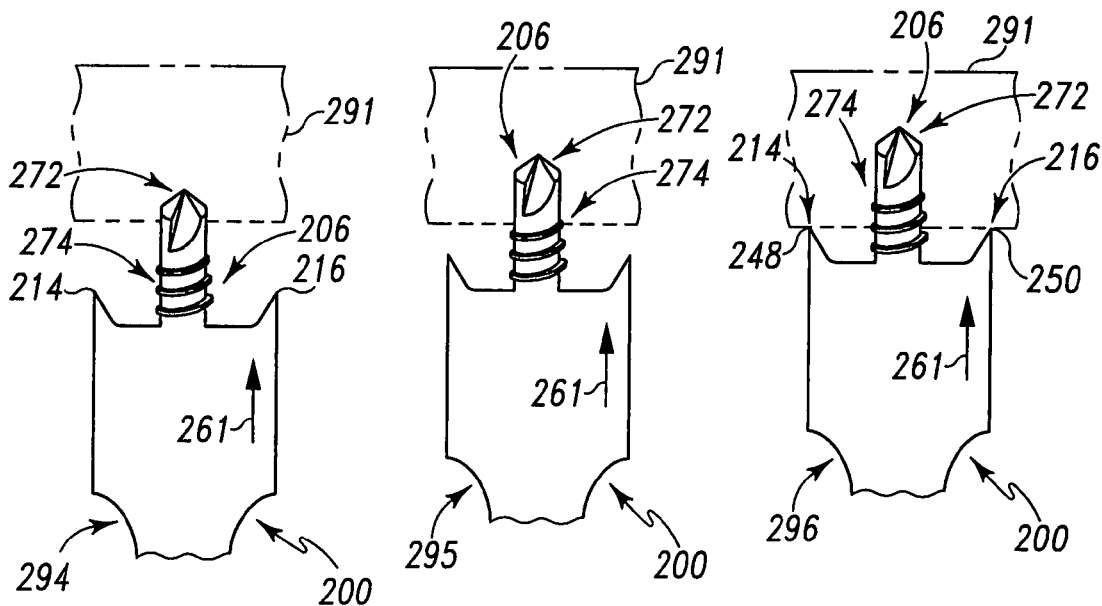
FIG. 18 is a partial plan view of the cutting bit of FIG. 9 with the self drilling portion of the central cutting member engaged with a wooden construction stud.
FIG. 19 is a partial plan view of the cutting bit of FIG. 9 with the self drilling portion and the self tapping portion of the central cutting member engaged with the wooden construction stud of FIG. 18.
FIG. 20 is a partial plan view of the cutting bit of FIG. 9 with the self drilling portion, the self tapping portion, and the cutting spurs partially engaged with the wooden construction stud of FIG. 19.

Referring now to FIG. 18, the cutting bit 200 of the present disclosure is shown in a first position 294 with the central cutting member 206 of the drill bit 200 in engagement with the work piece 291. The self-drilling portion 272 of the central cutting member 206 causes the spade drill bit to advance in the direction of arrow 261.

Referring now to FIG. 19, the cutting bit 200 is shown in a second position 295 with the central cutting member 206 engaged in work piece 291. At the second position 295, the central cutting member 206 is advanced only partially through work piece 291 as shown in FIG. 19. In second position 295, the self-tapping portion 274 of the central cutting member 206 engages with work piece 291.

Referring now to FIG. 20, the cutting bit 200 is shown in a third position 296 with the cutting edge 248 of the first cutting spur 214 and the cutting edge 250 of the second cutting spur contacting the work piece 291. The self-tapping portion 274 of the central cutting member 206 causes the cutting bit 200 to further advance in the direction of arrow 261. In the third position 296, the cutting spurs 214, 216, as well as the central cutting member 206 are simultaneously removing material from the work piece 291.

Referring now to FIG. 21, the spade drill bit 200 is shown in a fourth position 297 with the first cutting spur 214 and the second cutting spur 216 further engaged in the work piece 291.

Referring now to FIG. 22, the cutting bit is shown in a fifth position 298 with the cutting edge 244 of the first cutting edge segment 238 engaged with the work piece 291 and cutting edge 246 of the second cutting edge segment 240 engaged with the work piece 291. At the fifth position 298, the cutting edge segments 238 and 240, the cutting spurs 214 and 216, and the central cutting member 206 are all contacting and operating to cut material from the work piece 291 simultaneously.

Referring now to FIG. 23, the cutting bit 200 is shown in a sixth position 299 where the entire central cutting member 206 of the drill bit 200 has passed through the work piece 291 whereby an opening 293 is formed in the work piece 291. It should be appreciated that the work piece 291 has a thickness RBW. The rectangular portion 232 of the body 205 of the cutting bit 200 has a height RBH which is greater than the work piece thickness RBW.

The cutting bits 100, 100A, 200 are suited for drilling through wood materials, as well as metal components. The wood materials can range from soft to hard woods, and can have any of various dimensions. The metal components have a relatively shallow depth or thickness, and may for example be metal construction wall studs. It is contemplated that these bits can have application for boring through other materials having similar properties to wood or metal materials.

What is claimed is:

1. A cutting bit adapted to cut wood or metal, said cutting bit comprising:
    a shaft defining a shaft axis;
    a body portion extending distally from the shaft along the shaft axis;
    a first cutting edge segment located at a distal end of the body portion;
    a second cutting edge segment located at a distal end of the body portion, the shaft axis extending between the first cutting edge segment and the second cutting edge segment;
    a central cutting member extending distally from the body along the shaft axis;
    a first cutting spur extending distally from the body at a location outwardly of the first cutting edge segment; and
    a second cutting spur extending distally from the body at a location outwardly of the second cutting edge segment, wherein:
    the first cutting edge segment and the second cutting edge segment define a cutting edge axis that intersects the shaft axis at a first shaft axis location;
    when the first cutting spur is projected onto the shaft axis, a projected distal end of the first cutting spur is at a second shaft axis location that is spaced apart from the first shaft axis location by a distance that is greater than a thickness of a commonly sized work piece;
    the central cutting member comprises a substantially cylindrical base and a tip portion; and
    the tip portion includes a lip relief.

2. The cutting bit of claim 1, wherein the base comprises at least one helical thread.

3. The cutting bit of claim 1, wherein the second shaft axis location is spaced apart from the first shaft axis location by a distance that is greater than about 0.040 inches.

4. The cutting bit of claim 3, wherein the second shaft axis location is spaced apart from the first shaft axis location by a distance that is greater than about 0.080 inches.

5. The cutting bit of claim 1 wherein the central cutting member, the first cutting spur, and the second cutting spur have a hardness of at least about 55 RC.

* * * * *